United States Patent Office 3,390,168
Patented June 25, 1968

---

3,390,168
DISPERSE DYESTUFFS
Alfred Brack, Leverkusen, Germany, assignor to Farbenfabriken Bayer Aktiengesellschaft, Leverkusen, Germany, a corporation of Germany
No Drawing. Filed Dec. 4, 1964, Ser. No. 416,161
Claims priority, application Germany, Dec. 18, 1963,
F 41,573
18 Claims. (Cl. 260—465)

---

ABSTRACT OF THE DISCLOSURE

Disperse dyestuffs of the formula:

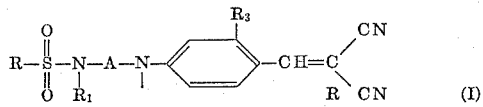

wherein R means an alkyl, cycloalkyl, aralkyl or aryl radical or a dialkylamino or N-alkyl-N-arylamino group, $R_1$ means hydrogen, an alkyl, cycloalkyl, aralkyl, aryl, alkylsulphonyl or amidosulphonyl group, $R_2$ denotes an alkyl, cycloalkyl or aralkyl radical, $R_3$ means hydrogen, an alkyl or alkoxy radical or a halogen atom, and A denotes an aliphatic chain which can also contain oxygen or sulphur atoms in ether- or thioether linkage; $R_1$ can also be linked to R or $R_3$, possibly with the inclusion of further hetero atoms; the radical $R_2$ can also be the radical

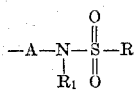

The radicals R, $R_1$, $R_2$, A and the benzene ring can contain non-ionic substituents.

---

The present invention relates to novel dyestuffs; more particular it relates to disperse dyestuffs of the general formula

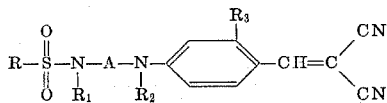   (I)

In this Formula I R means an alkyl, cycloalkyl, aralkyl or aryl radical or a dialkylamino or N-alkyl-N-arylamino group, $R_1$ means hydrogen, an alkyl, cycloalkyl, aralkyl, aryl, alkylsulphonyl or amidosulphonyl group, $R_2$ denotes an alkyl, cycloalkyl or aralkyl radical, $R_3$ means hydrogen, an alkyl or alkoxy radical or a halogen atom, and A denotes an aliphatic chain which can also contain oxygen or sulphur atoms in ether- or thioether linkage; $R_1$ can also be linked to R or $R_2$, possibly with the inclusion of further hetero atoms; the radical $R_2$ can also be the radical

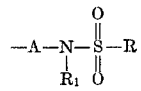

The radicals R, $R_1$ and $R_2$ as well as A and the benzene ring can contain non-ionic substituents, for example halogen atoms, alkyl, alkoxy, hydroxy, cyano, carboxylic acid ester, carboxylic acid amide, possibly further substituted sulphonamide groups, nitro, acyl, acylamino, sulphone, amino and substituted amino groups. The dyestuffs (I) are free of sulphonic acid and carboxylic acid groups.

The dyestuffs (I) are obtainable by condensing aldehydes of the general formula

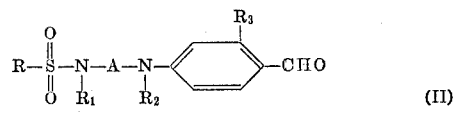   (II)

or their functional derivatives with malonic dinitrile in a manner known as such. In Formula II R, $R_1$, $R_2$, $R_3$ and A have the meaning given above; $R_1$ can be linked to R or $R_2$, optionally with the inclusion of further hetero atoms; the radicals R, $R_1$ and $R_2$ as well as A and the benzene ring can contain non-ionic substituents.

Among the alkyl radicals R, $R_1$, $R_2$ and $R_3$ lower alkyls having 1 to 5 carbon atoms such as methyl, ethyl, propyl, N-butyl, isobutyl and amyl are preferred; as halogen atoms chlorine and bromine are of particular interest. As cycloalkyl group cyclohexyl and as aralkyl group benzyl and non-ionically substituted benzyl groups are worth mentioning. Suitable aryl groupings are aside phenyl non-ionically substituted phenyl residues, such as chlorophenyl, bromophenyl, methyl phenyl, ethyl phenyl, methoxy phenyl, ethoxy phenyl, nitrophenyl, sulphonamido phenyl, methyl sulphonyl phenyl, ethyl sulphonyl phenyl, lower alkyl sulphonamido phenyl and others wherein the phenyl groups contain one or more of the above mentioned non-ionic substituents of the same or different nature; further substituted phenyls are for instance diethoxy phenyl, chloro and methyl substituted phenyl, bromo and ethyl substituted phenyl, methyl- and ethylamino substituted phenyl and others.

The aliphatic chain A which can contain oxygen or sulphur atoms in ether or thioether linkage is preferably a lower alkyl chain, e.g. having 2 to 3 carbon atoms, such as —$CH_2CH_2$— or —$CH_2CH_2CH_2$— or a lower alkylene oxy lower alkylene, such as —$CH_2CH_2$—O—$CH_2CH_2$— or a lower alkylene thio lower alkylene, such as

—$CH_2CH_2$—S—$CH_2CH_2$—.

The aldehydes (II) are obtainable by customary methods, for example according to the so-called Vilsmeier process. Examples of suitable aldehydes (II) are listed in the following tables:

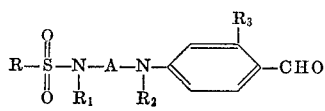

TABLE 1

| R | R₁ | R₂ | R₃ | A |
|---|---|---|---|---|
| $CH_3$ | $C_6H_5$ | $C_2H_5$ | $CH_3$ | $-CH_2-CH_2-$ |
| $C_2H_5$ | $C_6H_5$ | $C_2H_5$ | H | $-CH_2-CH_2-$ |
| $CH_2Cl$ | $C_6H_5$ | $C_2H_5$ | Cl | $-CH_2-CH_2-$ |
| $n-C_4H_9$ | $C_6H_{11}$ | $n-C_4H_9$ | H | $-CH_2-CH_2P$ |
| $C_6H_5CH_2$ | $C_6H_5$ | $CH_3$ | $OCH_3$ | $-CH_2-CH_2-$ |
| $C_6H_5CH_2CH_2$ | $CH_3\text{-}C_6H_4\text{-}$ | $C_6H_5CH_2$ | $OC_2H_5$ | $-CH_2-CH_2-$ |
| $C_6H_{11}$ | $i-C_4H_9$ | $n-C_3H_7$ | $C_2H_5$ | $-CH_2-CH_2-$ |
| $C_6H_5$ | $n-C_4H_9$ | $C_5H_{11}$ | H | $-CH_2-CH_2-$ |
| $CH_3\text{-}C_6H_4\text{-}$ | H | $C_2H_5$ | $CH_3$ | $-CH_2-CH_2-$ |
| $(CH_3)_2N-$ | $C_6H_5CH_2-$ | $C_2H_5$ | $CH_3$ | $-CH_2-CH_2-$ |
| $C_6H_5-N(CH_3)-$ | $i-C_3H_7$ | $n-C_4H_9$ | $CH_3$ | $-CH_2-CH_2-$ |
| $CH_3$ | $Cl\text{-}C_6H_4\text{-}$ | $CH_3$ | $CH_3$ | $-CH_2CH_2OCH_2CH_2-$ |
| $CH_3$ | $CH_3O\text{-}C_6H_4\text{-}$ | $C_2H_5$ | H | $-CH_2CH_2-S-CH_2CH_2-$ |
| $CH_3$ | $C_6H_{11}\text{-}C_6H_4\text{-}$ | $C_2H_5$ | $CH_3$ | $-CH_2-CH_2-$ |
| $CH_3$ | $2,5\text{-}(OC_2H_5)_2\text{-}C_6H_3\text{-}$ | $n-C_4H_9$ | $CH_3$ | $-CH_2-CH_2-$ |
| $CH_3$ | naphthyl | $C_2H_5$ | $CH_3$ | $-CH_2-CH_2-$ |
| $CH_3$ | $CH_3SO_2-$ | $C_2H_5$ | $CH_3$ | $-CH_2-CH_2-$ |

TABLE 2

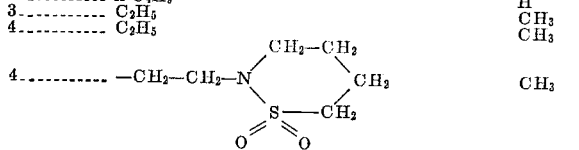

| R | R₃ |
|---|---|
| $CH_3$ | H |
| $CH_3$ | $CH_3$ |
| $C_2H_5$ | $OCH_3$ |
| $C_6H_5CH_2$ | Cl |
| $C_6H_5$ | $CH_3$ |
| $(CH_3)_2N-$ | H |

TABLE 3

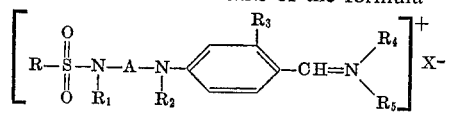

| n | R₂ | R₃ |
|---|---|---|
| 3 | $C_2H_5$ | H |
| 3 | $n-C_4H_9$ | H |
| 3 | $C_2H_5$ | $CH_3$ |
| 4 | $C_2H_5$ | $CH_3$ |
| 4 | $-CH_2-CH_2-N(CH_2CH_2)_2SO_2$ | $CH_3$ |

The condensation to produce the dyestuffs (I) can be carried out by melting an aldehyde (II) with malonic dinitrile if necessary in the presence of a catalyst. It is generally advantageous to heat the components in an inert solvent with addition of a catalyst to temperatures between 50 and 150° C., preferably 80 to 120° C. Suitable solvent are, for example, methanol, ethanol, n- and isobutanol, acetonitrile, dioxane, dimethyl formamide, benzene, toluene, chlorobenzene, chloroform, and ethylene chloride. Suitable catalysts are, for example, amines such as diethyl amine, triethyl amine, piperidine and morpholine, furthermore sodium and potassium hydroxide and sodium and potassium alcoholate. In place of the aldehyde (II) there may be used their functional derivatives, for example acetals, azomethines and nitrones derived from aldehydes (II). If, instead of the aldehydes (II), there are used the enamine salts of the formula $$\left[ \begin{array}{c} R-\overset{O}{\underset{O}{\overset{\|}{S}}}-N(R_1)-A-N(R_2)-C_6H_3(R_3)-CH=N(R_4)(R_5) \end{array} \right]^+ X^-$$

wherein R, R₁, R₂, R₃, and A have the meaning indicated above, R₄ stands for an alkyl group, R₅ for an alkyl or aryl group and X for an anion, which are primarily obtained in the production according to the method of Vilsmeier, no catalyst is required. In this case it is generally unnecessary to isolate the enamine salts, i.e. the reaction mixture obtained according to Vilsmeier can be reacted directly with malonic dinitrile, possibly after dilution with an inert liquid, such as chlorobenzene or ethylene chloride.

The new dyestuffs (I) are suitable for dyeing, printing and dyeing in the mass of materials which consist entirely or predominantly of polyamides, polyesters, polyurethanes or polystyrenes, as well as for the production of pastes for ball-point pens and for use in offset printings. Dyeings and prints on materials consisting entirely or predominantly of aromatic polyesters, such as polyethylene glycol terephthalate or the polycondensation product of 1,4-(bis-hydroxymethyl)-cyclohexane with terephthalic acid, polycarbonates or cellulose esters, are distinguished by excellent fastness properties, especially by excellent fastness to light, subliming, waste gas, pleating, rubbing and wet processing. The new dyestuffs give a high yield and draw very well and level. They are thermally stable and are eminently suitable for dyeing at temperatures above 100° C., for example at 180° C. When dyeing mixed fabrics, the wool or cotton component is not dyed.

It is known that green mixtures of blue and yellow disperse dyestuffs usually show less fastness to light on triacetate fibres than dyeings with either of the two individual components. The new dyestuffs, surprisingly have the advantage of not giving rise to a decrease in fastness to light when applied to triacetate fibres in mixtures with blue disperse dyestuffs.

The following examples are given for the purpose of illustrating the invention without, however, limiting it thereto; the parts being parts by weight.

Example 1

19.7 parts of the aldehyde of the formula

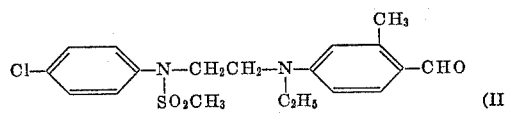

(III)

and 7 parts of malonic dinitrile are heated at boiling temperature for 1-2 hours with 200 parts of ethyl alcohol and 0.1-0.5 part of piperidine. The dyestuff separated upon cooling can be recrystallised from 40-50 parts of acetonitrile and corresponds to the formula

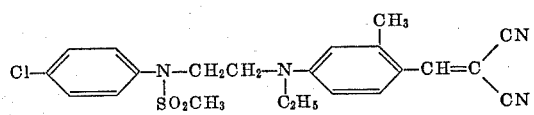

The dyestuff yields on fibres of polyethylene glycol terephthalate brilliant greenish yellow dyeings and prints of excellent fastness properties.

The aldehyde used is prepared in the following manner:

49 parts of methane-sulphonic acid-4-chloroanilide are introduced at 30–40° C. into a solution of 6 parts of sodium in 300 parts of isoamyl alcohol. To the mixture are added 47 parts of N - ethyl - N - 2' - chloroethyl-3-methyl-aniline and it is kept at boiling temperature for 2–3 hours. The isoamyl alcohol is then distilled off under reduced pressure, the residue is stirred with about 1000 parts of water and filtered off with suction. 84.5 parts of the compound

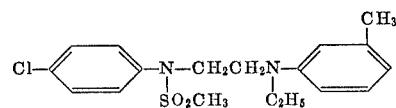

are obtained which as a crude product melts at 82–85° C. and is sufficiently pure for further processing. By recrystallisation from alcohol the melting point can be raised to 94° C. The sodium-isoamylate solution used can also be prepared from 10.5 parts of sodium hydroxide and iso-amyl alcohol by distilling off the water azeotropically.

59.5 parts of the crude product are dissolved in 50 parts of dimethyl formamide. 28 parts of phosphorus oxychloride are added dropwise at 60–70° C. to this solution, the mixture is stirred for 5 hours at 70–80° C. and then poured at no more than 50° C. into 1000 parts of water. The aldeyhde obtained can be purified by recrystallisation from 200–250 parts of alcohol. It corresponds to Formula III and it melts at 107° C.

If instead of aldehyde (III) there is used in each case the equivalent quantity of one of the following aldehydes of the general Formula II, the procedure according to Example 1 will produce colouristically similar dyestuffs of the corresponding Formula I, which dye fibres and fabrics of polyethylene glycol terephthalate likewise in very fast greenish yellow shades.

| R | R₁ | R₂ | R₃ | A |
|---|---|---|---|---|
| Methyl | Phenyl | Ethyl | Methyl | —CH₂—CH₂— |
| Do | do | do | Methoxy | —CH₂—CH₂— |
| Ethyl | 4-methylphenyl | do | Chlorine | —CH₂—CH₂— |
| n-butyl | 4-methoxy-phenyl | Methyl | Hydrogen | —CH₂—CH₂— |
| Benzyl | β-phenyl-ethyl | i-Butyl | do | —CH₂—CH₂— |
| 4-chloro-benzyl | i-Amyl | Cyclohexyl | do | —CH₂—CH₂— |
| Phenyl | Hydrogen | Ethyl | Methyl | —CH₂—CH₂— |
| 4-methyl-phenyl | Ethyl | β-Chloro-ethyl | do | —CH₂—CH₂— |
| i-Butyl | Cyclohexyl | Benzyl | Bromine | —CH₂—CH₂— |
| Phenyl | β-Phenyl-ethyl | Ethyl | Methyl | —CH₂—CH₂— |
| Methyl | α-Naphthyl | do | do | —CH₂—CH₂— |
| Do | 2-ethoxy-naphthyl-(1) | do | do | —CH₂—CH₂— |
| Do | 5-methoxy-naphthyl-(1) | do | do | —CH₂—CH₂— |
| Do | 4-bromo-naphthyl-(1) | n-Butyl | Hydrogen | —CH₂—CH₂— |
| Do | β-phenyl-ethyl | Ethyl | Methyl | —CH₂—CH₂— |
| Do | do | n-Butyl | Hydrogen | —CH₂—CH₂— |
| Cyclo-hexyl | Phenyl | Ethyl | Methyl | —CH₂—CH₂— |
| Methyl | 4-methoxy-phenyl | do | do | —CH₂—CH₂— |
| Do | do | do | Methoxy | —CH₂—CH₂— |
| Do | do | do | Ethoxy | —CH₂—CH₂— |
| Do | 4-ethoxy-phenyl | do | Methyl | —CH₂—CH₂— |
| Do | do | do | Methoxy | —CH₂—CH₂— |
| Do | do | do | Ethoxy | —CH₂—CH₂— |
| Do | Benzyl | do | Methyl | —CH₂—CH₂— |
| Do | do | do | Methoxy | —CH₂—CH₂— |
| Do | p-Bromo-phenyl | do | do | —CH₂—CH₂— |
| Do | 4-Chloro-naphthyl-1 | do | do | —CH₂—CH₂— |

These aldehydes can be produced in analogy with aldehyde (III).

Example 2

12.2 parts of the aldehyde of formula

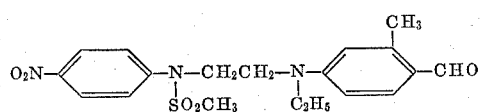

are dissolved in 75–100 parts of acetonitrile. To the solution are added 2 parts of malonic dinitrile and 0.05–0.5 part of diethylamine or triethylamine, it is heated at boiling temperature for 1–2 hours and subsequently evaporated to half its volume. The dyestuff which separates upon cooling is filtered off with suction at 0° C. and corresponds to the formula

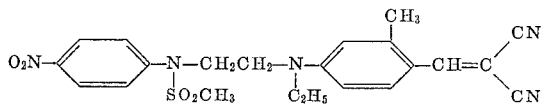

It dyes polyethylene glycol terephthalate fibres yellow with excellent fastness properties.

The aldehyde used is prepared as follows:

21.6 parts of methane-sulphonic acid-4-nitroanilide are heated at boiling temperature with 4.5 parts of sodium hydroxide (or with 6.0 parts of potassium hydroxide) and 19.8 parts of N-ethyl-N-2'-chloroethyl-3-methyl-aniline in 125–200 parts of technical amyl alcohol for 2–3 hours. The amyl alcohol is then distilled off and the residue recrystallised from alcohol. The compound

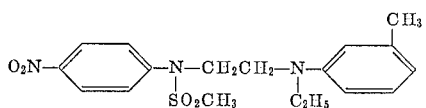

is obtained in the form of yellowish crystals which melt at 128° C. The introduction of the aldehyde group is carried out according to the instructions of Example 1. After recrystallisation from acetonitrile the melting point of the aldehyde is 150–154° C.

If instead of this aldehyde there is used in each case the equivalent quantity of one of the following aldehydes, the procedure being otherwise unchanged, valuable dyestuffs are likewise obtained which dye fibres of polyethylene glycol terephthalate and cellulose triacetate in greenish yellow shades with very good fastness properties.

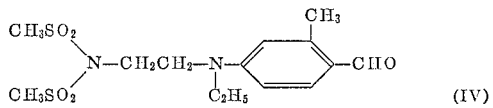

| n | $R_2$ | $R_3$ |
|---|---|---|
| 3 | $C_2H_5$ | H |
| 3 | n-$C_4H_9$ | H |
| 3 | $C_2H_5$ | $CH_3$ |
| 4 | $C_2H_5$ | $CH_3$ |
| 4 | —$CH_2$—$CH_2$—N$\begin{smallmatrix}CH_2-CH_2\\ \\S\\ O_2\end{smallmatrix}$CH$_2$ | $CH_3$ |

Example 3

10.5 parts of the aldehyde of the formula

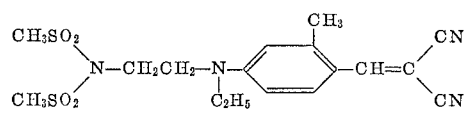

and 2 parts of malonic dinitrile are heated at boiling temperature for one hour with 200 parts of methanol and 0.05 to 0.1 part of piperidine or morpholine. The bulk of the methanol is then distilled off. The dyestuff of the formula CH₃SO₂
        \
         N—CH₂CH₂—N—⟨ ⟩—CH=C(CN)(CN)
        /                |    |
CH₃SO₂                  C₂H₅  CH₃ is obtained which dyes fibres and fabrics of polyethylene glycol terephthalate or cellulose triacetate greenish yellow, with very good fastness properties.

The aldehyde (IV) is obtained as follows:

32.2 parts of bis-methane-sulphonyl imide ("Dimesylimid") are introduced in portions at 25–30° C. into a solution of 4.8 parts of sodium in 200–250 parts of n-amyl alcohol. After about 5 minutes, 37.2 parts of N-ethyl-N-2'-chloroethyl-3-methyl-aniline are added and the mixture is heated for 4 hours at boiling temperature. The amyl alcohol is then completely distilled off. The residue is stirred twice with hot water, dried and dissolved in 250 parts of chlorobenzene. To this solution are added 25 parts of N-formyl-monomethyl-aniline, and 30 parts of phosphorus oxychloride are added dropwise at 70–80° C. After stirring for 8 hours at 80–90° C., the reaction product is decomposed by the addition of water, the chlorobenzene is driven off with steam and the crude aldehyde which has separated is recrystallised from alcohol. The melting point is 140–141° C.

Example 4

To a mixture of 75 parts of dimethyl formamide, 361 parts of the compound

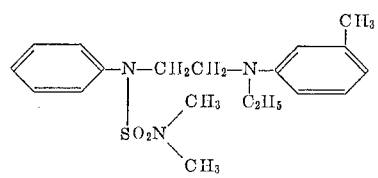

and 750 parts of ethylene chloride, 165 parts of phosphorus oxychloride are added dropwise at 70–80° C. The mixture is stirred from 8 hours at 70–80° C. and then a solution of 66 parts of malonic dinitrile in 250 parts of ethylene chloride is allowed to run in at this temperature. After stirring for 1–2 hours at 70–80° C., this ethylene chloride is distilled off and the residue is treated with 500 parts of water, whereby care has to be taken that the temperature does not exceed 50° C. The crude product thus obtained is purified by recrystallisation from alcohol. The dyestuff corresponds to the formula

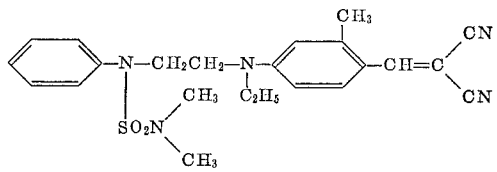

and dyes materials of polyethylene glycol terephthalate greenish yellow with very good fastness properties.

The compound (V) is obtained as follows:

93 parts of aniline are stirred into a solution of 45 parts of sodium hydroxide in 750 parts of water. To this emulsion 144 parts of N,N-dimethyl-sulphamic acid chloride are added dropwise, whereby the temperature should not rise above 40° C. The reaction product which frequently separates first as an oil, solidifies quickly and can be filtered off with suction. It melts at 77–83° C. After recrystallising a sample from a mixture of benzene and cyclohexane (1:1), the melting point is 88° C. The results of analysis correspond to the formula

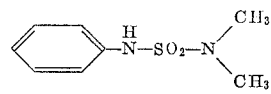

20 parts of the dry crude product are introduced at 20–30° C. into a solution of 2.5 parts of sodium in 125 parts of isoamyl alcohol and heated at boiling temperature for 2 hours with 20 parts of N-ethyl-N-2'-chloroethyl-3-methyl aniline. The isoamyl alcohol is then distilled off under reduced pressure and the residue shaken with 250 parts of water at about 60° C. The reaction product which separates first as an oil, crystallises upon cooling. It can be purified by re-dissolving it from n-hexane and melts at 51° C. The results of analysis correspond to Formula V.

Example 5

A solution of 52.9 parts of the aldehyde of the formula

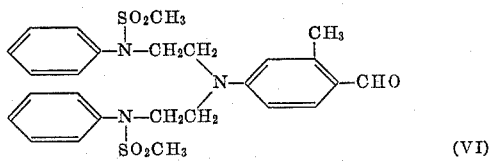
(VI)

in 200 parts of dimethyl formamide is mixed with 6.6 parts of malonic dinitrile and 0.05–0.5 part of piperidine and heated for 1–2 hours at 110–120° C. After cooling, 150 parts of water are added dropwise, the mixture is further stirred for several hours at room temperature and the separated dyestuff is filtered off with suction. It is constituted according to the formula

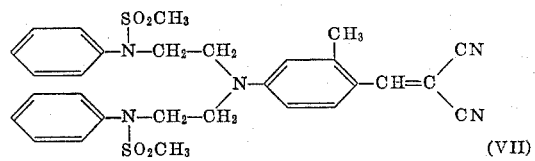
(VII)

and is suitable for the dyeing, printing and dyeing in the mass of fabrics of polyethylene glycol terephthalate in greenish yellow shades of excellent fastness properties.

The aldehyde (VI) is prepared as follows:

33 parts of methane-sulphonic acid anilide are heated at boiling temperature for 3–4 hours with 22.2 parts of N,N-di(2′-chloroethyl)-3-methyl-aniline and a sodium iso-amylate solution prepared from 5 parts of sodium and 200 parts of isoamyl alcohol. On cooling, the compound of the formula

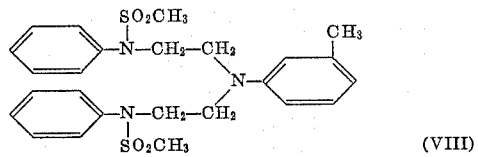
(VIII)

separates in the form of colourless crystals which melt at 135–136° C. After recrystallisation from alcohol or acetonitrile, the melting point is 147–148° C.

22 parts of the compound (VIII) are dissolved in 50 parts of dimethyl-formamide, and 8 parts of phosphorus oxychloride are added at 50–70° C. The mixture obtained is heated for 4 hours at 70–80° C. and then poured into 500 parts of water at about 50° C. The aldehyde (VI) obtained is recrystallised from dioxane and melts at 186° C.

If, instead of the aldehyde (VI), there is used in each case the equivalent quantity of one of the following aldehydes obtainable in an analogous manner, the otherwise unchanged procedure will produce greenish yellow dyestuffs with similar fastness properties.

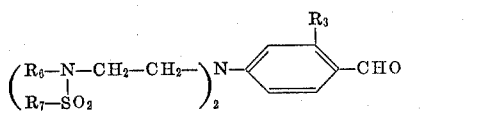

| $R_6$ | $R_7$ | $R_3$ |
|---|---|---|
| Cl—C$_6$H$_4$— | CH$_3$ | H |
| H | C$_6$H$_5$ | CH$_3$ |
| H$_5$C$_2$O—C$_6$H$_4$— | CH$_3$ | CH$_3$ |
| C$_6$H$_{11}$ | n-C$_4$H$_9$ | H |
| CH$_3$ | ClCH$_2$ | OCH$_3$ |
| C$_2$H$_5$ | C$_2$H$_5$ | CH$_3$ |
| i-C$_3$H$_7$ | n-C$_4$H$_9$ | H |

Example 6

A dyebath consisting of:

0.1 part of the well dispersed dyestuff of the formula

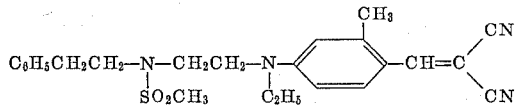

2.0 parts of o-phenylphenol or an equivalent quantity of another dyeing accelerator, for example a chlorinated benzene hydrocarbon, salicylic acid or cresotic acid ester, and 400 parts of water is adjusted with sulphuric acid to a pH value of 4–5 and charged at 30–40° C. with 10 parts of polyethylene glycol terephthalate fibres.

While moving the fibre material the bath is heated to the boil within about 30 minutes and kept at boiling temperature for one hour. After rinsing and drying, a brilliant greenish yellow dyeing is obtained with very good fastness to light, washing and subliming.

Example 7

A dyebath consisting of 0.1 part of the dyestuff indicated in Example 6 and 400 parts of water is adjusted with sulphuric acid to a pH value of 4–5 and charged with 10 parts of polyethylene glycol terephthalate fibres.

The bath is heated in a closed dyeing apparatus to 120–125° C. within about 30 minutes and dyeing is carried out at this temperature for one hour. After rinsing and drying, a greenish yellow dyeing is obtained with the fastness properties as indicated.

Example 8

A polyester fabric ready for printing is printed with a dye paste of the following composition:

5–10 parts of the dyestuff of the formula

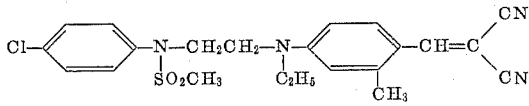

50 parts of thiodiethylene glycol
500 parts of alginate thickening
15 parts of cresotic acid ester
20 parts of monopol brilliant oil
405–410 parts of water 1000 parts Fixation of the dyestuff is carried out either by steaming at about 100° C. or by brief dry heating to about 200° C. The material is then rinsed cold, soaped at 70–80° C. for about 10 minutes, rinsed first hot and then cold and dried. A brilliant greenish yellow print is obtained with excellent fastness to light, washing, subliming and rubbing.

The composition of the printing paste employed can be modified in a suitable manner without any deterioration in the quality of the prints produced with it. Thus, for example, crystal gum may be used instead of the alginate thickener, or the cresotic acid ester may be replaced by another dyeing accelerator.

Example 9

0.2 part of the well dispersed dyestuff of the formula

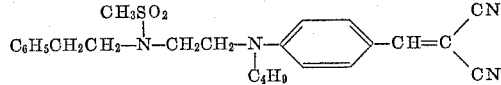

is stirred at about 20° C. with 2 parts of water and 2–3 parts of salicylic acid or cresotic acid ester. 400 parts of water are added and a sufficient quantity of formic acid to reach a pH value between 4.5 and 5, the bath is heated to about 50° C. and charged with 10 parts of cellulose triacetate fibres. While moving the fibres about, the temperature is raised to 98° C. within 20 minutes and the dyebath is kept at 98° C. to boiling temperature for 1–1½ hours. After rinsing and drying, a greenish yellow dyeing with excellent fastness properties is obtained.

I claim:
1. A dyestuff of the formula:

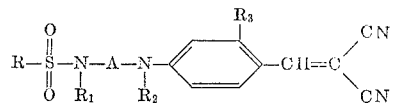

wherein R stands for a member selected from the class consisting of lower alkyl, cyclohexyl, benzyl, phenylethyl, phenyl, di(lower alkyl)amino, N-methyl-N-phenylamino, and phenyl substituted with 1–2 members of the group consisting of lower alkyl, lower alkoxy, cyclohexyl, chloro, bromo, nitro, lower alkyl amino, amidosulfonyl, and methyl sulfonyl, $R_1$ stands for a member selected from the class consisting of hydrogen, lower alkyl, cyclohexyl, benzyl, phenylethyl, phenyl, naphthyl, lower alkylsulfonyl, and phenyl or naphthyl substituted with 1–2 members of the group consisting of lower alkyl, methoxy, ethoxy, cyclohexyl, chloro, bromo, nitro, lower alkylamino, amidosulfonyl, and lower alkylsulfonyl, $R_2$ stands for a member selected from the class consisting of lower alkyl, cyclohexyl, benzyl, and

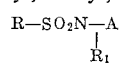

$R_3$ stands for a number selected from the class consisting of hydrogen, lower alkyl, methoxy, ethoxy, chloro, and bromo, A stands for a member selected from the class consisting of lower alkylene, lower alkyleneoxy lower alkylene and lower alkylene thio lower alkylene.

2. A dyestuff of claim 1 wherein A is —CH$_2$CH$_2$—.
3. A dyestuff of the formula

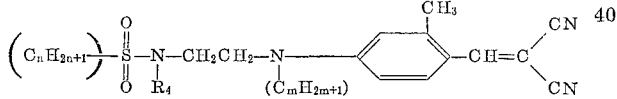

wherein $n$ and $m$ are integers ranging from 1 to 4, $R_4$ is an aryl radical selected from the class consisting of phenyl, lower alkoxy phenyl, lower alkyl phenyl, chlorophenyl, bromophenyl, nitrophenyl, naphthyl, lower alkoxy naphthyl, bromonaphthyl and chloronaphthyl.

4. A dyestuff of the formula

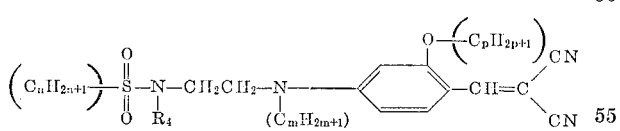

wherein $n$, $m$ and $p$ are integers ranging from 1 to 4, $R_4$ is an aryl radical selected from the class consisting of phenyl, lower alkoxy phenyl, lower alkyl phenyl, chlorophenyl, bromophenyl, nitrophenyl, naphthyl, lower alkoxy naphthyl, bromonaphthyl and chloronaphthyl.

5. A dyestuff of the formula

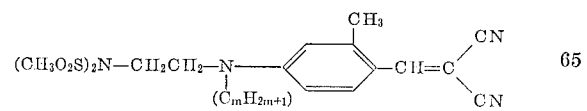

wherein $m$ is an integer ranging from 1 to 4.

6. A dyestuff of the formula

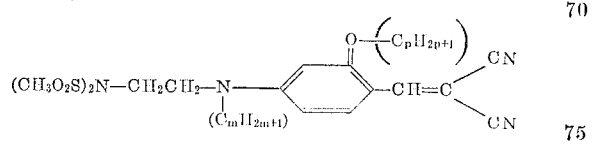

wherein $m$ and $p$ are integers ranging from 1 to 4.

7. A dyestuff of the formula

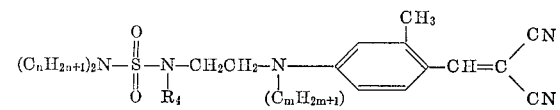

wherein $n$ and $m$ are integers ranging from 1 to 4 and $R_4$ is an aryl radical selected from the class consisting of phenyl, lower alkoxy phenyl, lower alkyl phenyl, chlorophenyl, bromophenyl, nitrophenyl, naphthyl, lower alkoxy naphthyl, bromonaphthyl and chloronaphthyl.

8. A dyestuff of the formula

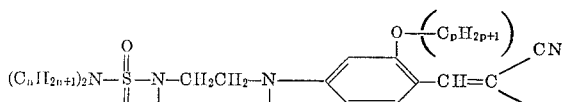

wherein $n$, $m$ and $p$ are integers ranging from 1 to 4 and $R_4$ is an aryl radical selected from the class consisting of phenyl, lower alkoxy phenyl, lower alkyl phenyl, chlorophenyl, bromophenyl, nitrophenyl, naphthyl, lower alkoxy naphthyl, bromonaphthyl and chloronaphthyl.

9. The dyestuff of the formula

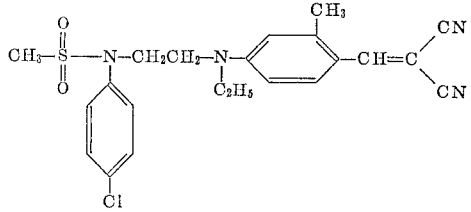

10. The dyestuff of the formula

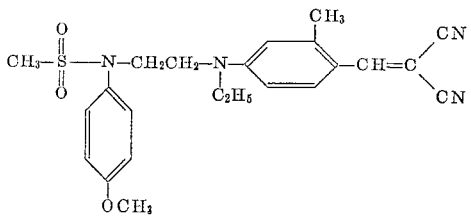

11. The dyestuff of the formula

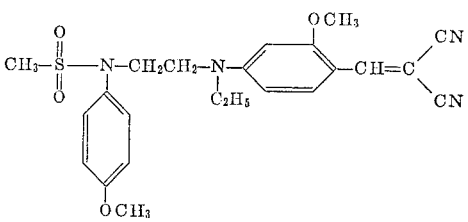

12. The dyestuff of the formula

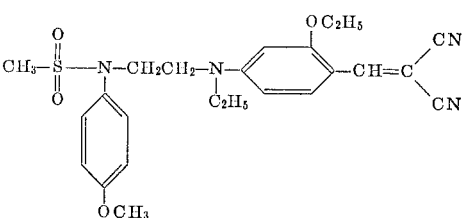

13. The dyestuff of the formula

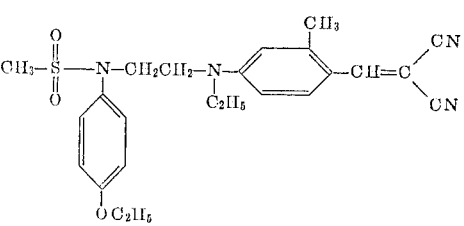

14. The dyestuff of the formula
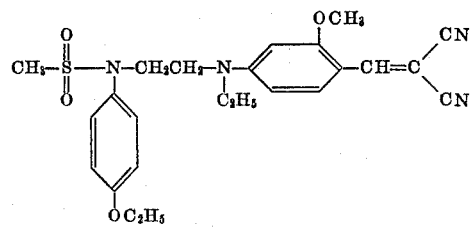
15. The dyestuff of the formula
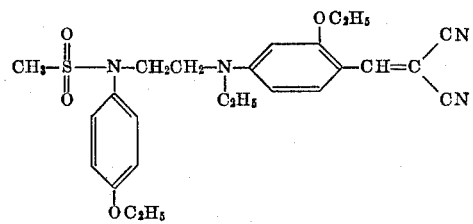
16. The dyestuff of the formula
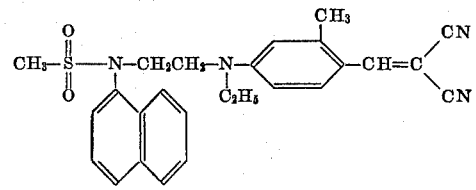
17. The dyestuff of the formula
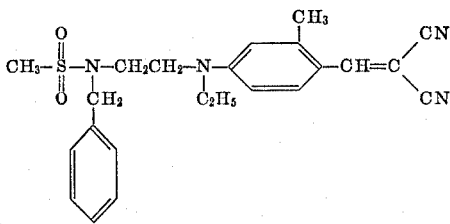
18. The dyestuff of the formula
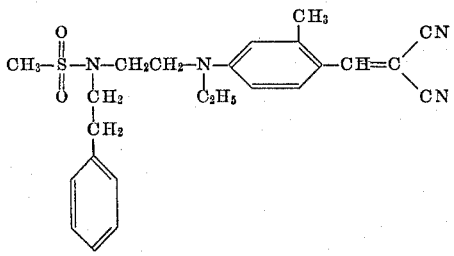
References Cited
UNITED STATES PATENTS
3,141,018   7/1964   Straley et al.
FOREIGN PATENTS
582,316   9/1959   Belgium.
JOSEPH P. BRUST, *Primary Examiner.*
CHARLES B. PARKER, *Examiner.*
D. R. MAHANAND, *Assistant Examiner.*

UNITED STATES PATENT OFFICE
CERTIFICATE OF CORRECTION

Patent No. 3,390,168                                      June 25, 1968

Alfred Brack

It is certified that error appears in the above identified patent and that said Letters Patent are hereby corrected as shown below:

Column 1, line 31, "$R_3$" should read -- $R_2$ --; same column 1, lines 49 to 54, the formula should appear as shown below:

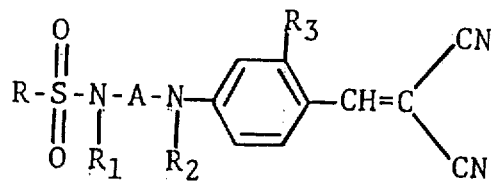

Column 2, line 35, "N-butyl" should read -- n-butyl --. Columns 3 and 4, TABLE I, under the heading "$R_1$"

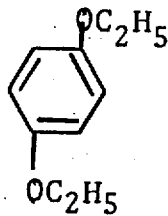      should read      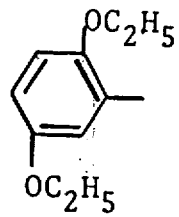

same TABLE I, under the heading "A", line 5 thereof, "-$CH_2$-$CH_2$P" should read -- -$CH_2$-$CH_2$- --. Column 4, line 50, "solvent" should read -- solvents --; line 57, "hyde" should read -- hydes --. Column 6, line 29, "aldheyde" should read -- aldehyde --. Column 8, line 27, "from" should read -- for --; line 30, "this" should read -- the --. Column 11, line 32, "number" should read -- member --.

Signed and sealed this 16th day of December 1969.

(SEAL)
Attest:

EDWARD M. FLETCHER, JR.
Attesting Officer

WILLIAM E. SCHUYLER, JR.
Commissioner of Patents